US009520125B2

(12) United States Patent
Mitsui et al.

(10) Patent No.: US 9,520,125 B2
(45) Date of Patent: Dec. 13, 2016

(54) SPEECH SYNTHESIS DEVICE, SPEECH SYNTHESIS METHOD, AND SPEECH SYNTHESIS PROGRAM

(75) Inventors: Yasuyuki Mitsui, Tokyo (JP); Masanori Kato, Tokyo (JP); Reishi Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 346 days.

(21) Appl. No.: 14/131,409

(22) PCT Filed: Jun. 8, 2012

(86) PCT No.: PCT/JP2012/003760
§ 371 (c)(1),
(2), (4) Date: Jan. 7, 2014

(87) PCT Pub. No.: WO2013/008384
PCT Pub. Date: Jan. 17, 2013

(65) Prior Publication Data
US 2014/0149116 A1    May 29, 2014

(30) Foreign Application Priority Data

Jul. 11, 2011    (JP) ................................. 2011-152849

(51) Int. Cl.
*G10L 13/00*    (2006.01)
*G10L 13/06*    (2013.01)
(Continued)

(52) U.S. Cl.
CPC ............... *G10L 15/08* (2013.01); *G10L 13/08* (2013.01); *G10L 2013/105* (2013.01)

(58) Field of Classification Search
CPC .......... G10L 13/00; G10L 13/06; G10L 13/08; G10L 21/00; G10L 13/04
(Continued)

(56) References Cited

U.S. PATENT DOCUMENTS 6,236,964 B1 *   5/2001   Tamura ................... G10L 15/10
                                                       704/238
6,665,641 B1 * 12/2003   Coorman ................ G10L 13/07
                                                       704/258

(Continued)

FOREIGN PATENT DOCUMENTS

JP    2002169583 A  * 12/2000  ............. G10L 13/08
JP    2002-169583        6/2002

(Continued)

OTHER PUBLICATIONS

Tokuda et al. "Hidden Markov models based on multi-space probability distribution for pitch pattern modeling." Acoustics, Speech, and Signal Processing, 1999. Proceedings,, 1999 IEEE International Conference on. vol. 1. IEEE, 1999.*

(Continued)

*Primary Examiner* — Pierre-Louis Desir
*Assistant Examiner* — Seong Ah A Shin
(74) *Attorney, Agent, or Firm* — Wilmer Cutler Pickering Hale and Dorr LLP

(57) ABSTRACT

There are provided a speech synthesis device, a speech synthesis method and a speech synthesis program which can represent a phoneme as a duration shorter than a duration upon modeling according to a statistical method. A speech synthesis device 80 according to the present invention includes a phoneme boundary updating means 81 which, by using a voiced utterance likelihood index which is an index indicating a degree of voiced utterance likelihood of each state which represents a phoneme modeled by a statistical method, updates a phoneme boundary position which is a boundary with other phonemes neighboring to the phoneme.

15 Claims, 11 Drawing Sheets

(51) Int. Cl.
*G10L 13/08* (2013.01)
*G10L 21/00* (2013.01)
*G10L 13/04* (2013.01)
*G10L 15/08* (2006.01)
*G10L 13/10* (2013.01)

(58) Field of Classification Search
USPC ............... 704/207, 208, 240, 254, 260, 268, 231,704/239
See application file for complete search history.

(56) References Cited

U.S. PATENT DOCUMENTS

| | | | | |
|---|---|---|---|---|
| 2004/0172238 | A1* | 9/2004 | Choo | G10L 15/04 704/202 |
| 2006/0224391 | A1* | 10/2006 | Tamura | G10L 13/07 704/268 |
| 2009/0144053 | A1* | 6/2009 | Tamura | G10L 13/06 704/207 |
| 2009/0313019 | A1* | 12/2009 | Kato | G10L 17/26 704/254 |
| 2010/0250257 | A1* | 9/2010 | Hirose | G10L 13/033 704/278 |
| 2013/0218568 | A1* | 8/2013 | Tamura | G10L 13/033 704/260 |

FOREIGN PATENT DOCUMENTS

| | | |
|---|---|---|
| JP | 2004-341259 | 12/2004 |
| JP | 2007-233181 | 9/2007 |

OTHER PUBLICATIONS

Yoshimura et al. "Duration modeling for HMM-based speech synthesis." ICSLP. vol. 98. 1998.*

Miyazaki, N. et al., "An HMM Based on Multi-Space Probability Distributions and its Application to Pitch Pattern Modeling", Technical Research Report of the Institute of Electronics, Information and Communication Engineers, The Institute of Electronics, Apr. 24, 1998, 8 pages.

Miyazaki, N. et al., "A Study on Pitch Pattern Generation Using HMMS Based on Multi-Space Probability Distributions", Technical Report of IEICE SP, Onsei, vol. 98, No. 33, The Institute of Electronics, Information and Communication Engineers, Apr. 24, 1998, 11 pages.

International Search Report corresponding to PCT/JP2012/003760, dated Aug. 9, 2012, 5 pages.

* cited by examiner

SPEECH SYNTHESIS DEVICE, SPEECH SYNTHESIS METHOD, AND SPEECH SYNTHESIS PROGRAM

CROSS-REFERENCE TO RELATED APPLICATIONS

This application is a national stage application of International Application No. PCT/JP2012/003760 entitled "Speech Synthesis Device, Speech Synthesis Method, and Speech Synthesis Program," filed on Jun. 8, 2012, which claims the benefit of the priority of Japanese Patent Application No. 2011-152849, filed on Jul. 11, 2011, the disclosures of each of which are hereby incorporated by reference in their entirety.

TECHNICAL FIELD

The present invention relates to a speech synthesis device, a speech synthesis method and a speech synthesis program which generate a waveform upon speech synthesis using phoneme duration information generated by a statistical method.

BACKGROUND ART

As a speech synthesis method using a statistical method, Hidden Markov Model (HMM) speech synthesis using Hidden Markov Model is known. A prosody generated by HMM speech synthesis is represented by using a specific number of states.

Further, as a method of simultaneously modeling pitch patterns of a voiced sound and an unvoiced sound, MSD-HMM (Multi-Space Probability Distribution HMM) is known (see Non-Patent Literature 1). Upon speech synthesis based on MSD-HMM, to generate a waveform, whether to generate a waveform as a voiced or an unvoiced is determined based on an index (referred to as a voiced utterance likelihood index below) which indicates the degree of voiced utterance likelihood.

CITATION LIST

Non-Patent Literature

Non-Patent Literature 1: MIYAZAKI, and three others, "AN HMM BASED ON MULTI-SPACE PROBABILITY DISTRIBUTIONS AND ITS APPLICATION TO PITCH PATTERN MODELING", Technical Research Report of The Institute of Electronics, Information and Communication Engineers, The Institute of Electronics, Information and Communication Engineers, Apr. 24, 1998, pp. 19-26

SUMMARY OF INVENTION

Technical Problem

A duration (referred to as a phoneme duration below) of a phoneme is a sum of lengths of frames which represent respective states. Therefore, a duration of a target phoneme cannot be made shorter than the number of analytical frames×the number of states. For example, the length of one frame is 5 msec, and the number of states is 5. In this case, the shortest phoneme duration is 5 msec×5 states=25 msec, and cannot be made shorter than this length.

By increasing resolution of analysis (that is, by narrowing a frame width), it is possible to shorten the shortest phoneme duration. However, when the resolution of analysis is simply increased, there is a problem that a calculation amount increases.

Further, there is a likelihood that only training data of a very short phoneme duration exists depending on a phoneme. When, for example, training data is created from speech of a person of rapid utterance, there is a likelihood that a phoneme duration of each phoneme becomes short. When speech synthesis is performed using this data, it is difficult to reproduce a phoneme duration.

It is therefore an exemplary object of the present invention to provide a speech synthesis device, a speech synthesis method and a speech synthesis program which can represent a phoneme as a duration shorter than a duration upon modeling according to a statistical method.

Solution to Problem

A speech synthesis device according to the present invention includes a phoneme boundary updating means which, by using a voiced utterance likelihood index which is an index indicating a degree of voiced utterance likelihood of each state which represents a phoneme modeled by a statistical method, updates a phoneme boundary position which is a boundary with other phonemes neighboring to the phoneme.

A speech synthesis method according to the present invention includes, by using a voiced utterance likelihood index which is an index indicating a degree of voiced utterance likelihood of each state which represents a phoneme modeled by a statistical method, updating a phoneme boundary position which is a boundary with other phonemes neighboring to the phoneme.

A speech synthesis program according to the present invention causes a computer to execute: phoneme boundary update processing of, by using a voiced utterance likelihood index which is an index indicating a degree of voiced utterance likelihood of each state which represents a phoneme modeled by a statistical method, updating a phoneme boundary position which is a boundary with other phonemes neighboring to the phoneme.

Advantageous Effects of Invention

The present invention can represent a phoneme as a duration shorter than a duration upon modeling according to a statistical method.

DESCRIPTION OF EMBODIMENTS

Figure 1:
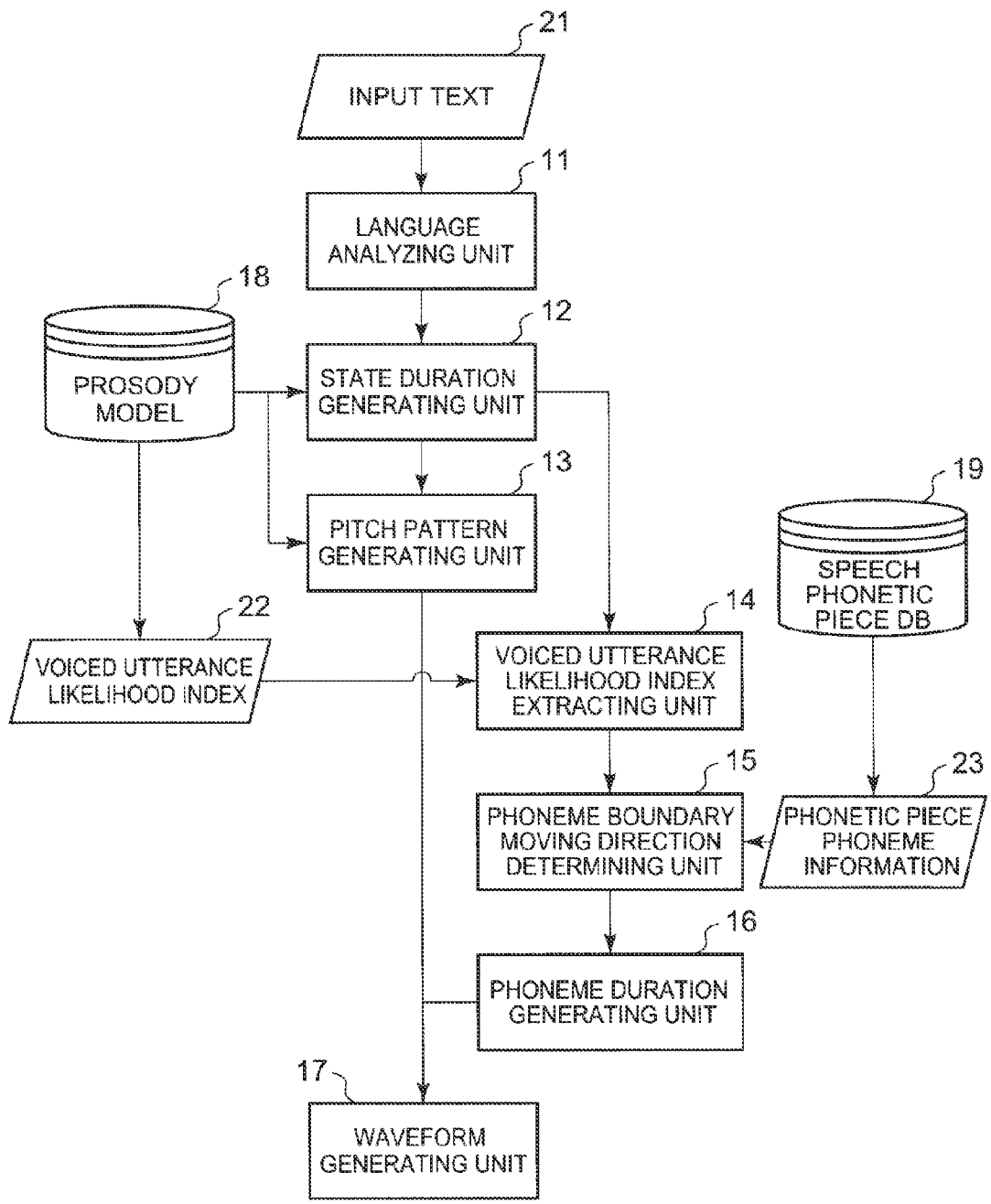
FIG. 1 It depicts a block diagram illustrating a configuration example of a speech synthesis device according to a first exemplary embodiment of the present invention.

Hereinafter, exemplary embodiments of the present invention will be described with reference to the drawings. First Exemplary Embodiment FIG. 1 depicts a block diagram illustrating a configuration example of a speech synthesis device according to a first exemplary embodiment of the present invention. The speech synthesis device according to the present exemplary embodiment includes a language analyzing unit 11, a state duration generating unit 12, a pitch pattern generating unit 13, a voiced utterance likelihood index extracting unit 14, a phoneme boundary moving direction determining unit 15, a phoneme duration generating unit 16, a waveform generating unit 17, a prosody model memory unit 18 and a speech phonetic piece database (referred to as a speech phonetic piece DB below) memory unit 19.

The prosody model memory unit 18 stores a prosody model generated by a statistical method. Meanwhile, the prosody model indicates a model created by MSD-HMM. As described above, a voiced utterance likelihood index 22 is an index which indicates the degree of voiced utterance likelihood, and is information which is derived per state from a prosody model upon training according to the statistical method. The prosody model memory unit 18 may store the voiced utterance likelihood index 22 set to each state as is. Further, the prosody model memory unit 18 may not store the voiced utterance likelihood index 22 itself, and the voiced utterance likelihood index extracting unit 14 described below may derive a voiced utterance likelihood index from a prosody model.

As described above, the voiced utterance likelihood index is an index which indicates whether each state represented by HMM has a feature of a voiced sound or a feature of an unvoiced sound (including silence). When a voiced utterance likelihood index is higher, it is decided that a feature of a voiced sound is remarkable. As a specific example of a method of deriving a voiced utterance likelihood index, there is a method of using as a voiced utterance likelihood index a mixing coefficient of a Gaussian mixture model (GMM) as expressed by equation (27) in Non-Patent Literature 1.

Further, generally, an unvoiced sound has the property of high energy in a high band (high frequency) portion. Furthermore, the property includes that a shape of a spectrum in a high band is bigger than that in a low band. Then, a result obtained by analyzing spectrum components using, for example, Fourier transform (FFT) may be used as a voiced utterance likelihood index. Further, a result obtained by using a voiced/unvoiced determining method which uses a linear predictive coefficient, a zero-crossing rate or power of a waveform may be used as a voiced utterance likelihood index.

Furthermore, although a case will be described with the present exemplary embodiment as an example where a voiced utterance likelihood index is set per state, a voiced utterance likelihood index may be set in frame units.

The speech phonetic piece DB memory unit 19 stores an attribute per unit (phonetic piece) to create speech. This attribute includes a waveform of each phoneme, information which indicates a vowel/consonant and information which indicates voiced/unvoiced. These pieces of information are stored in the speech phonetic piece DB memory unit 19 in advance. In addition, instead of storing information which indicates voiced/unvoiced in the speech phonetic piece DB memory unit 19, the phoneme boundary moving direction determining unit 15 described below may determine a voiced or an unvoiced based on information which indicates a phoneme. Meanwhile, if the speech phonetic piece DB memory unit 19 stores information which indicates voiced/unvoiced, the phoneme boundary moving direction determining unit 15 does not need to perform the above determination processing. Hence, the speech phonetic piece DB memory unit 19 preferably stores information which indicates voiced/unvoiced in advance from a view point of an increase in a processing speed.

The prosody model memory unit 18 and the speech phonetic piece DB memory unit 19 are realized by, for example, magnetic disks.

The language analyzing unit 11 performs language analysis processing such as morphological analysis on an input text 21. Further, the language analyzing unit 11 performs processing of assigning additional information which is necessary for speech synthesis such as an accent position or an accent phrase segmentation, or adding a change to a language analysis result. Meanwhile, the language analysis processing performed by the language analyzing unit 11 is not limited to the above content. The language analyzing unit 11 additionally performs processing of analyzing how to read letters included in the input text 21.

The state duration generating unit 12 calculates a state duration based on an analysis result of the language analyzing unit 11 and the prosody model. In addition, the phoneme duration is generated by the phoneme duration generating unit 16 described below. A case will be described below where one phoneme is represented by five states. Further, the pitch pattern generating unit 13 generates pitch patterns based on the calculation result of the state duration generating unit 12 and the prosody model.

The voiced utterance likelihood index extracting unit 14 extracts a voiced utterance likelihood index corresponding to each state, from the prosody model memory unit 18. When, for example, the prosody model memory unit 18 stores the voiced utterance likelihood index 22 set to each state, the voiced utterance likelihood index extracting unit 14 may extract the voiced utterance likelihood index 22 corresponding to each state, from the prosody model memory unit 18. Further, the voiced utterance likelihood index extracting unit 14 may read the prosody model from the prosody model memory unit 18, and derive the voiced utterance likelihood index of each state from this prosody model. In this case, the prosody model preferably includes spectrum information.

Using the voiced utterance likelihood index of each state which represents a phoneme modeled by the statistical method, the phoneme boundary moving direction determining unit 15 updates a boundary (referred to as a phoneme boundary position) with other phonemes neighboring to this phoneme.

First, the phoneme boundary moving direction determining unit 15 specifies whether each state which represents a phoneme indicates a voiced state or an unvoiced state. More specifically, the phoneme boundary moving direction determining unit 15 determines whether or not the voiced utterance likelihood index per state exceeds a threshold set in advance. When the voiced utterance likelihood index exceeds the threshold, the phoneme boundary moving direction determining unit 15 specifies this state as a voiced state. Meanwhile, when the voiced utterance likelihood index does not exceed the threshold, the phoneme boundary moving direction determining unit 15 specifies this state as an unvoiced state. The phoneme boundary moving direction determining unit 15 may specify that each state indicates the voiced state or the unvoiced state, and then set a flag to each state. The phoneme boundary moving direction determining unit 15 may set a flag "H" to each state when, for example, each state indicates the voiced state and sets a flag "L" to each state when each state indicates an unvoiced state.

In the following description, a result (the flag "H" and the flag "L") of determining whether each state indicates the voiced state or the unvoiced state based on the voiced utterance likelihood index is referred to as voiced utterance likelihood determination information.

Next, the phoneme boundary moving direction determining unit 15 determines a direction in which the phoneme boundary position is moved depending on whether a phoneme before and after a phoneme boundary is an unvoiced sound or a voiced sound and whether a state before and after the phoneme boundary indicates the voiced state or the unvoiced state. A type in case that a phoneme is an unvoiced sound (also including silence such as a pause) is referred to as "U", and a type in case that a phoneme is a voiced sound is referred to as "V" below. Further, types determined in this way are referred to as UV types. That is, the UV types can be called as information for identifying whether each phoneme is a voiced sound or a voiced sound. More specifically, the phoneme boundary moving direction determining unit 15 extracts phonetic piece phoneme information 23 corresponding to each phoneme, from the speech phonetic piece DB memory unit 19, and determines whether each phoneme is an unvoiced sound or a voiced sound.

Figures 2, 3:
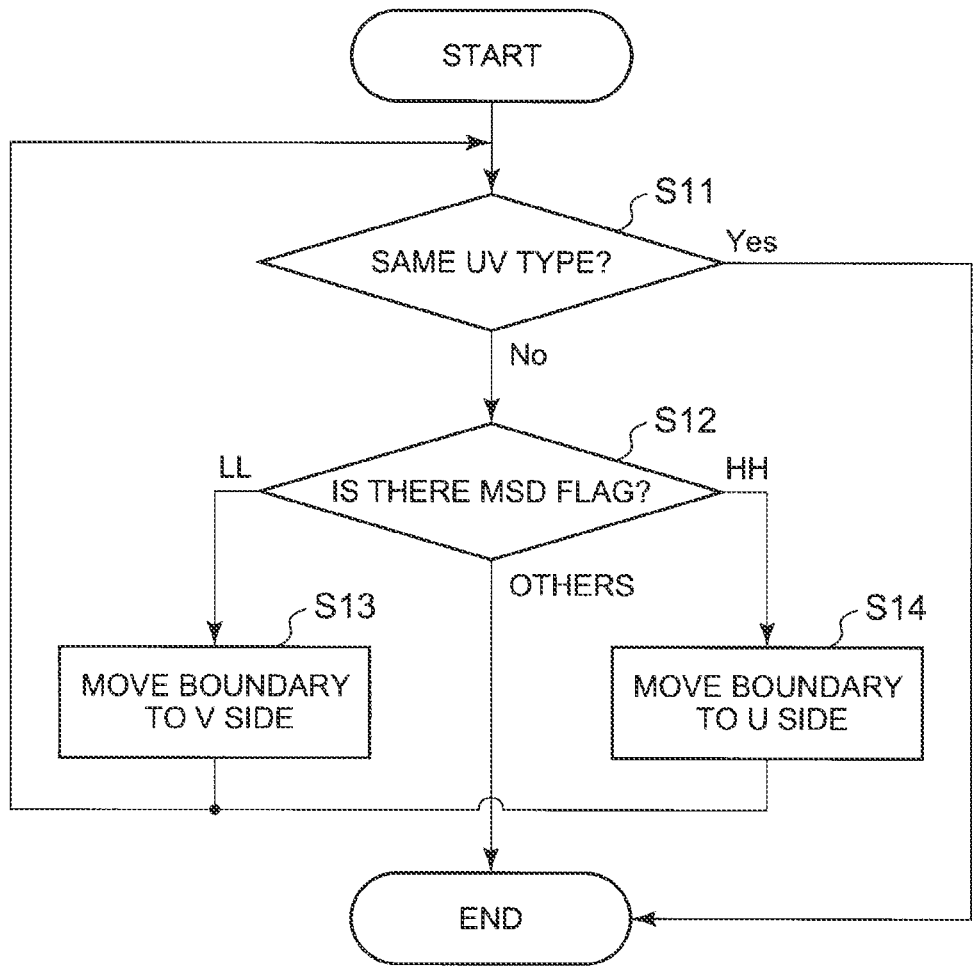
FIG. 2 It depicts a flowchart illustrating an example of processing of determining a direction in which a phoneme boundary position is moved.
FIG. 3 It depicts an explanatory view illustrating an example of a correspondence relationship between voiced utterance likelihood determination information and a moving direction of the phoneme boundary position.

FIG. 2 depicts a flowchart illustrating an example of processing of determining a direction in which a phoneme boundary position is moved. First, the phoneme boundary moving direction determining unit 15 determines whether neighboring phonemes (that is, phonemes before and after a phoneme boundary) are the same UV type (step S11). When the UV types are the same (Yes in step S11), the phoneme boundary moving direction determining unit 15 finishes processing. Meanwhile, when the UV types are different (No in step S11), the phoneme boundary moving direction determining unit 15 determines a relationship between voiced utterance likelihood determination information indicated by the states before and after the phoneme boundary (step S12). More specifically, the phoneme boundary moving direction determining unit 15 determines the moving direction of the phoneme boundary position based on a correspondence relationship set in advance.

FIG. 3 depicts an explanatory view illustrating an example of a correspondence relationship between voiced utterance likelihood determination information and a moving direction of the phoneme boundary position. A table illustrated in FIG. 3 is a table which defines a direction in which the phoneme boundary position is moved according to content of voiced utterance likelihood determination information (L or H) of each state in case of an unvoiced sound (U) and a voiced sound (V). When, for example, neighboring phonemes are arranged in order of the unvoiced sound (U) and the voiced sound (V), and voiced utterance likelihood determination information of the unvoiced sound is "L" and voiced utterance likelihood determination information of the voiced sound is "H", that the phoneme boundary is not changed (that is, the phoneme boundary is not moved) is derived from this table.

When both pieces of voiced utterance likelihood determination information indicated by the neighboring states are "L" (LL in step S12), the phoneme boundary moving direction determining unit 15 moves the phoneme boundary position to the V side (step S13). Further, when both pieces of voiced utterance likelihood determination information indicated by the neighboring states are "H" (HH in step S12), the phoneme boundary moving direction determining unit 15 moves the phoneme boundary position to the U side (step S14). Meanwhile, when contents of voiced utterance likelihood determination information indicated by the neighboring states are different ("other" in step S12), the phoneme boundary moving direction determining unit 15 finishes processing without moving the phoneme boundary position.

Figure 4:
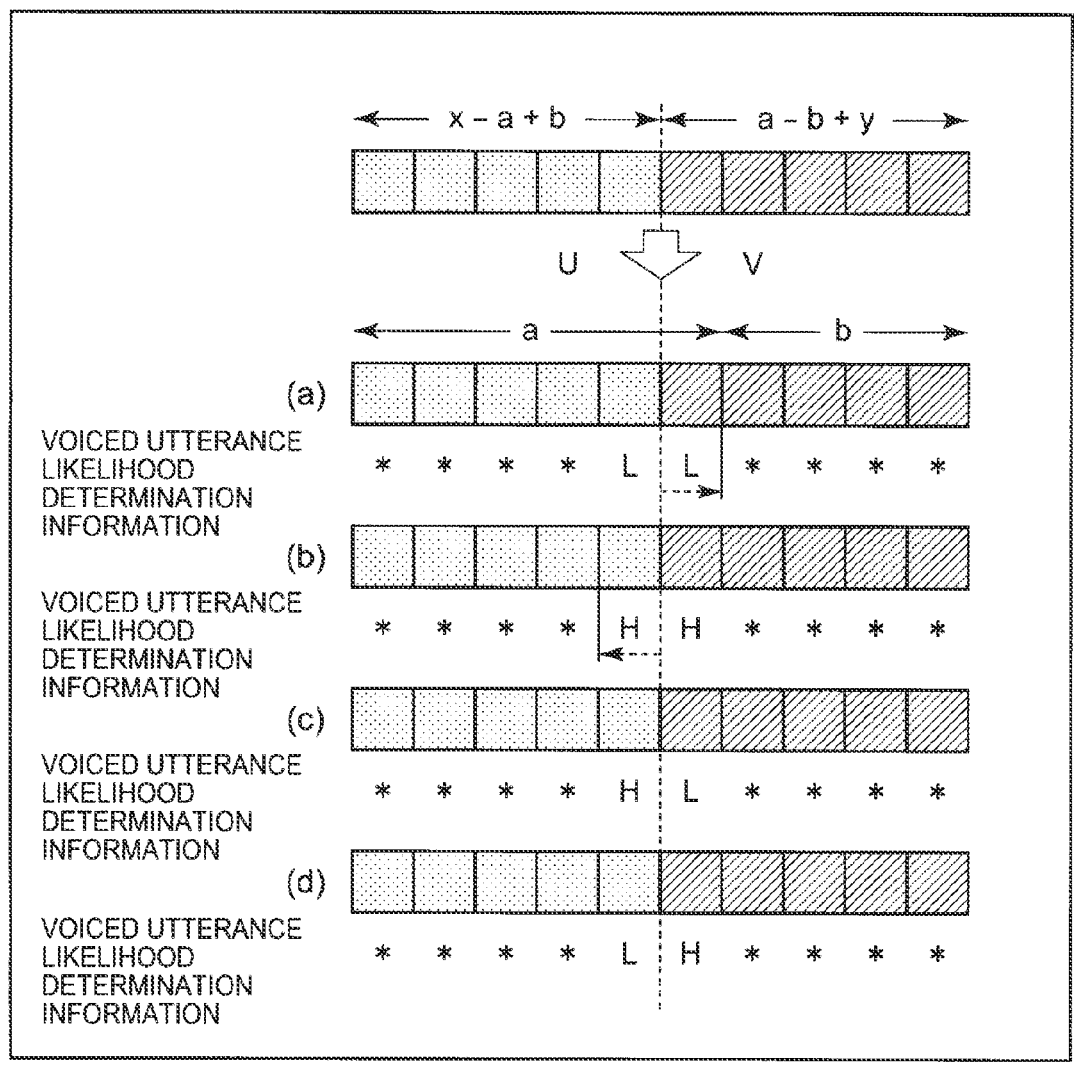
FIG. 4 It depicts an explanatory view illustrating an example of a method of changing a phoneme boundary position.

Processing of moving a phoneme boundary will be further described using FIG. 4. FIG. 4 depicts an explanatory view illustrating an example of a method of changing a phoneme boundary. In the example illustrated in FIG. 4, a phoneme boundary (referred to as a U-V boundary below) between an unvoiced sound and a voiced sound moves according to voiced utterance likelihood determination information indicated by neighboring states. Meanwhile, each phoneme illustrated in FIG. 4 is represented by five states, and one cell represents one state. In addition, a phoneme "a" is an unvoiced sound, and a phoneme "b" is a voiced sound.

When both pieces of voiced utterance likelihood determination information indicated by states neighboring at a phoneme boundary are "L" (refer to FIG. 4(*a*)), the phoneme boundary moving direction determining unit 15 moves the phoneme boundary only a width corresponding to one state to the V side (that is, to the voiced sound side). Further, when both pieces of voiced utterance likelihood determination information indicated by states neighboring at a phoneme boundary are "H" (refer to FIG. 4(*b*)), the phoneme boundary moving direction determining unit 15 moves the phoneme boundary only a width corresponding to one state to the V side (that is, to the voiced sound side). The phoneme boundary moving direction determining unit 15 moves the phoneme boundary position, then verifies voiced utterance likelihood determination information indicated by the states neighboring at this phoneme boundary and repeats the same processing. Meanwhile, when respective pieces of voiced utterance likelihood determination information indicated by states neighboring at a phoneme boundary are "H" and "L" or "L" and "H", the phoneme boundary moving direction determining unit 15 does not move the phoneme boundary position (see FIGS. 4(*c*) and (*d*)).

When moving the position of the phoneme boundary, the phoneme boundary moving direction determining unit 15 moves the phoneme boundary position only a length corresponding to the width of each state. When, for example, one state is one frame and one frame is 5 msec, the phoneme boundary moving direction determining unit 15 moves the phoneme boundary position by 5 msec.

A method where the phoneme boundary moving direction determining unit 15 sets voiced utterance likelihood determination information depending on whether or not a voiced utterance likelihood index of each state exceeds a threshold set in advance, and updates a phoneme boundary position has been described above. However, the method where the phoneme boundary moving direction determining unit 15 updates a phoneme boundary position is not limited to the above method. The phoneme boundary moving direction determining unit 15 may update a phoneme boundary position based on, for example, a difference between voiced utterance likelihood indices of neighboring states. In this case, it is not necessary to specify whether each state indicates a voiced state or an unvoiced state.

A method of determining a boundary without specifying a voiced state or an unvoiced state will be described below using a specific example. Meanwhile, when the total number of states of two phonemes sandwiching the U-V boundary is M and a voiced utterance likelihood index is $v_i (0 \leq v_i \leq 1, i \in M)$, the difference between the neighboring voiced utterance likelihood indices is represented by $\Delta v_i = v_i - v_{i-1}$. To determine the boundary, the phoneme boundary moving direction determining unit 15 calculates a difference $\Delta v_i$ between the voiced utterance likelihood indices in order. Further, the phoneme boundary moving direction determining unit 15 determines a boundary between an i−1th state and an ith state at a point of time when $\Delta v_i$ exceeds the threshold set in advance.

Figure 5:
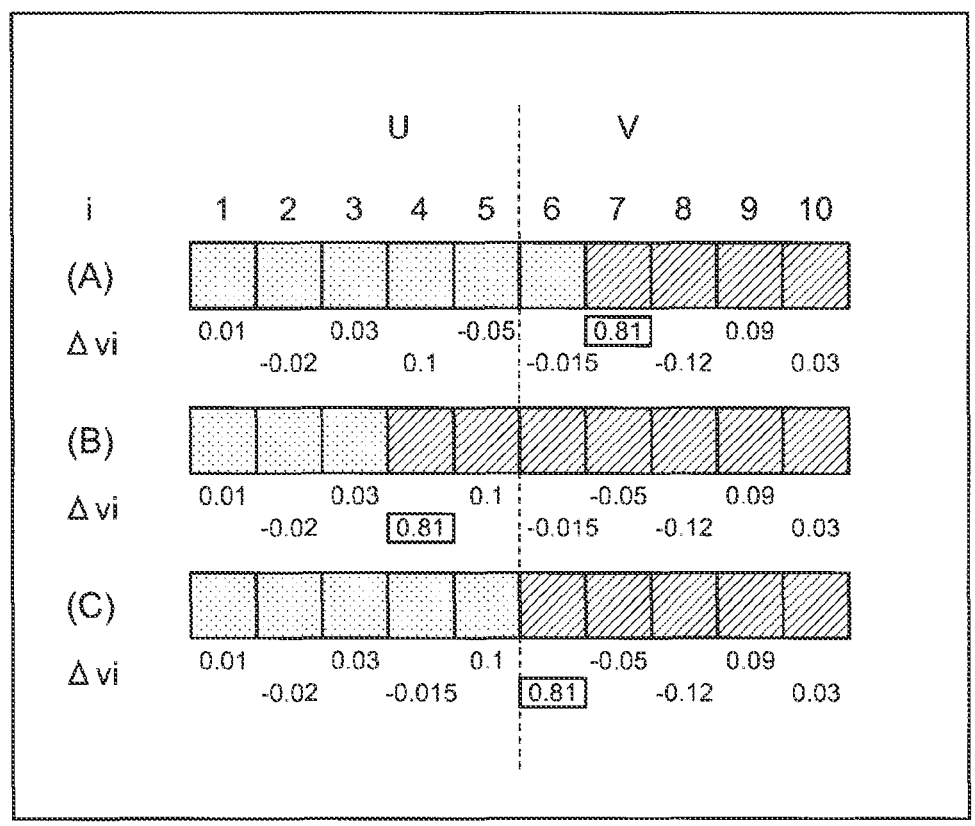
FIG. 5 It depicts an explanatory view illustrating an example of a method of determining a boundary.

FIG. 5 is an explanatory view illustrating an example of a method of determining a boundary without specifying a voiced state/unvoiced state. Meanwhile, a threshold is 0.8. In an example illustrated in FIG. 5(A), when $\Delta v_i$ is calculated in order from i=1, if i=7 holds, $\Delta v_7 = 0.81$ holds and $v_i$ exceeds a threshold. Hence, the phoneme boundary moving direction determining unit 15 determines the U-V boundary between a frame of i=6 and a frame of i=7.

Similarly, in an example illustrated in FIG. 5(B), when $\Delta v_i$ is calculated in order from i=1, if i=4 holds, $\Delta v_4 = 0.81$ holds and $v_i$ exceeds a threshold. Hence, the phoneme boundary moving direction determining unit 15 determines the U-V boundary between a frame of i=3 and a frame of i=4. Similarly, in an example illustrated in FIG. 5(C), when $\Delta v_i$ is calculated in order from i=1, if i=6 holds, $\Delta v_6 = 0.81$ holds and $v_i$ exceeds a threshold. Hence, the phoneme boundary moving direction determining unit 15 determines the U-V boundary between a frame of i=5 and the frame of i=6. That is, in this case, the boundary is not changed.

In addition, a case has been described with the example illustrated in FIG. 5 where the phoneme boundary moving direction determining unit 15 determines a boundary using the difference $\Delta v_i$ between voiced utterance likelihood indices and the threshold. In addition, the phoneme boundary moving direction determining unit 15 may determine a boundary by transitioning the difference $\Delta v_i$. Further, the phoneme boundary moving direction determining unit 15 may determine a boundary using $\Delta^2 v_i$ which is a difference of $\Delta v_i$ (corresponding to a second difference).

The phoneme duration generating unit 16 calculates a duration of each phoneme based on a phoneme boundary position moved by the phoneme boundary moving direction determining unit 15. The phoneme boundary moving direction determining unit 15 moves the phoneme boundary position in, for example, a direction in which a target phoneme is shortened, and the moved width is one frame and one frame is 5 msec. In this case, the phoneme duration generating unit 16 may set as a phoneme duration a time obtained by subtracting 5 msec from the duration of this phoneme. Meanwhile, a method where the phoneme duration generating unit 16 calculates a phoneme duration is not limited to the above method.

The waveform generating unit 17 generates a speech waveform based on the phoneme duration calculated by the phoneme duration generating unit 16 and the pitch pattern generated by the pitch pattern generating unit 13. In other words, the waveform generating unit 17 generates synthesized speech based on these pieces of information.

The language analyzing unit 11, the state duration generating unit 12, the pitch pattern generating unit 13, the voiced utterance likelihood index extracting unit 14, the phoneme boundary moving direction determining unit 15, the phoneme duration generating unit 16 and the waveform generating unit 17 are realized by a CPU of a computer which operates according to a program (speech synthesis program). For example, the program may be stored in a memory unit (not illustrated) of the speech synthesis device, and the CPU may read this program and operate as the language analyzing unit 11, the state duration generating unit 12, the pitch pattern generating unit 13, the voiced utterance likelihood index extracting unit 14, the phoneme boundary moving direction determining unit 15, the phoneme duration generating unit 16 and the waveform generating unit 17 according to the program. Further, the language analyzing unit 11, the state duration generating unit 12, the pitch pattern generating unit 13, the voiced utterance likelihood index extracting unit 14, the phoneme boundary moving direction determining unit 15, the phoneme duration generating unit 16 and the waveform generating unit 17 may be realized by dedicated hardwares.

Figure 6:
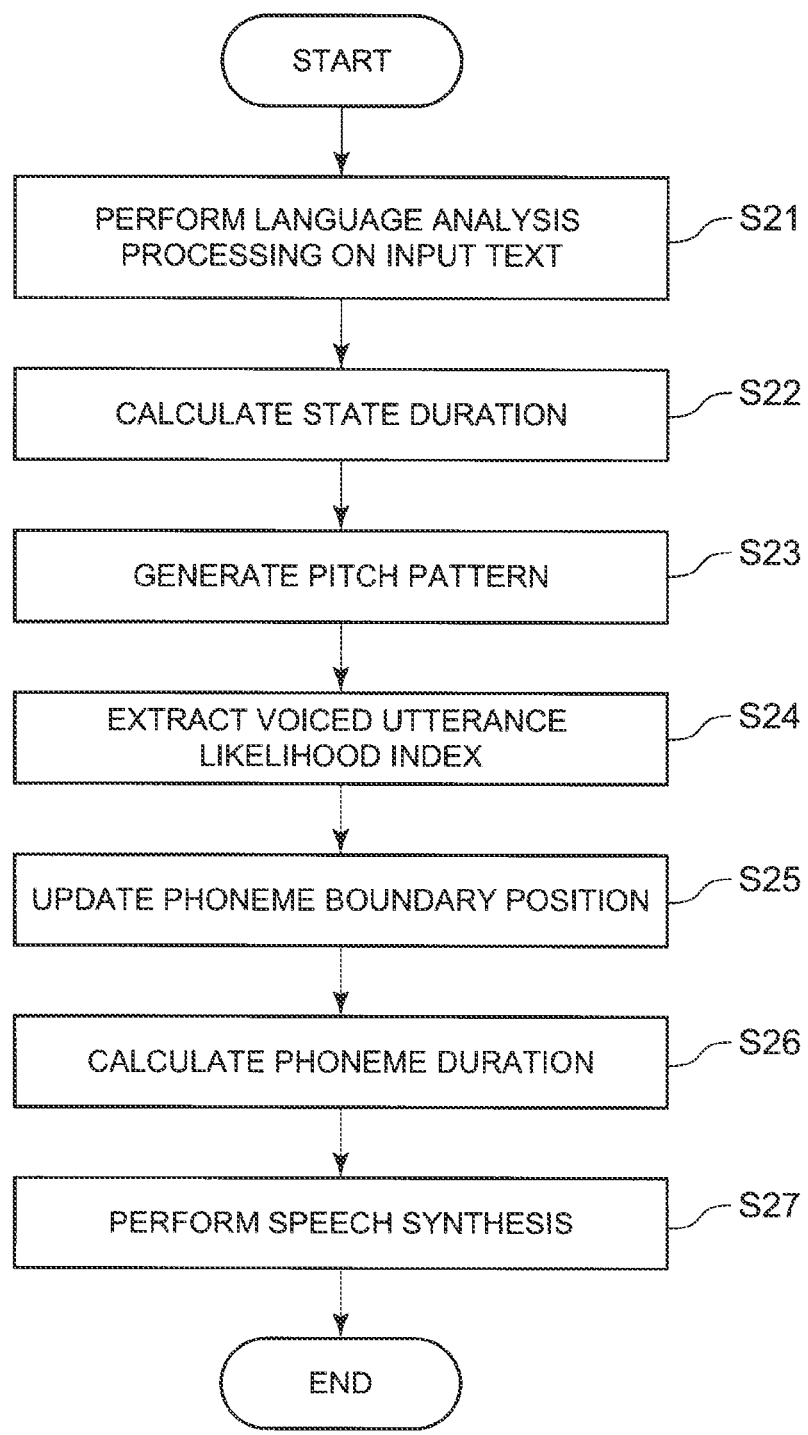
FIG. 6 It depicts a flowchart illustrating an example of an operation of the speech synthesis device according to the first exemplary embodiment.

Next, an operation of the speech synthesis device according to the present exemplary embodiment will be described. FIG. 6 depicts a flowchart illustrating an example of an operation of the speech synthesis device according to the present exemplary embodiment. When the speech synthesis device receives an input of the input text 21, the language analyzing unit 11 performs language analysis processing such as morphological analysis (step S21). Further, the state duration generating unit 12 calculates a state duration based on an analysis result of the language analyzing unit 11 and the prosody model stored in the prosody model memory unit 18 (step S22).

The pitch pattern generating unit 13 generates pitch patterns based on the calculation result of the state duration generating unit 12 and the prosody model (step S23). Meanwhile, the voiced utterance likelihood index extracting unit 14 extracts a voiced utterance likelihood index 22 of each state, from the prosody model memory unit 18 (step S24). Subsequently, using the voiced utterance likelihood index of each state which represents a phoneme modeled by HMM, the phoneme boundary moving direction determining unit 15 updates a phoneme boundary position (step S25). In this case, the phoneme boundary moving direction determining unit 15 may determine a direction in which the phoneme boundary position is moved based on voiced utterance likelihood determination information. Further, the phoneme boundary moving direction determining unit 15 may determine a direction in which the phoneme boundary position is moved, based on a difference between voiced utterance likelihood indices of neighboring states.

The phoneme duration generating unit 16 calculates a duration of each phoneme based on a phoneme boundary position moved by the phoneme boundary moving direction determining unit 15 (step S26). Further, the waveform generating unit 17 generates a speech waveform based on the phoneme duration calculated by the phoneme duration generating unit 16 and the pitch pattern generated by the pitch pattern generating unit 13 (step S27).

As described above, according to the present exemplary embodiment, by using the voiced utterance likelihood index of each state which represents a phoneme modeled by the statistical method (for example, MSD-HMM), the phoneme boundary moving direction determining unit 15 updates a phoneme boundary position with other phonemes neighboring to this phoneme. Consequently, it is possible to represent a phoneme as a duration shorter than a duration upon modeling according to a statistical method.

Figure 7:
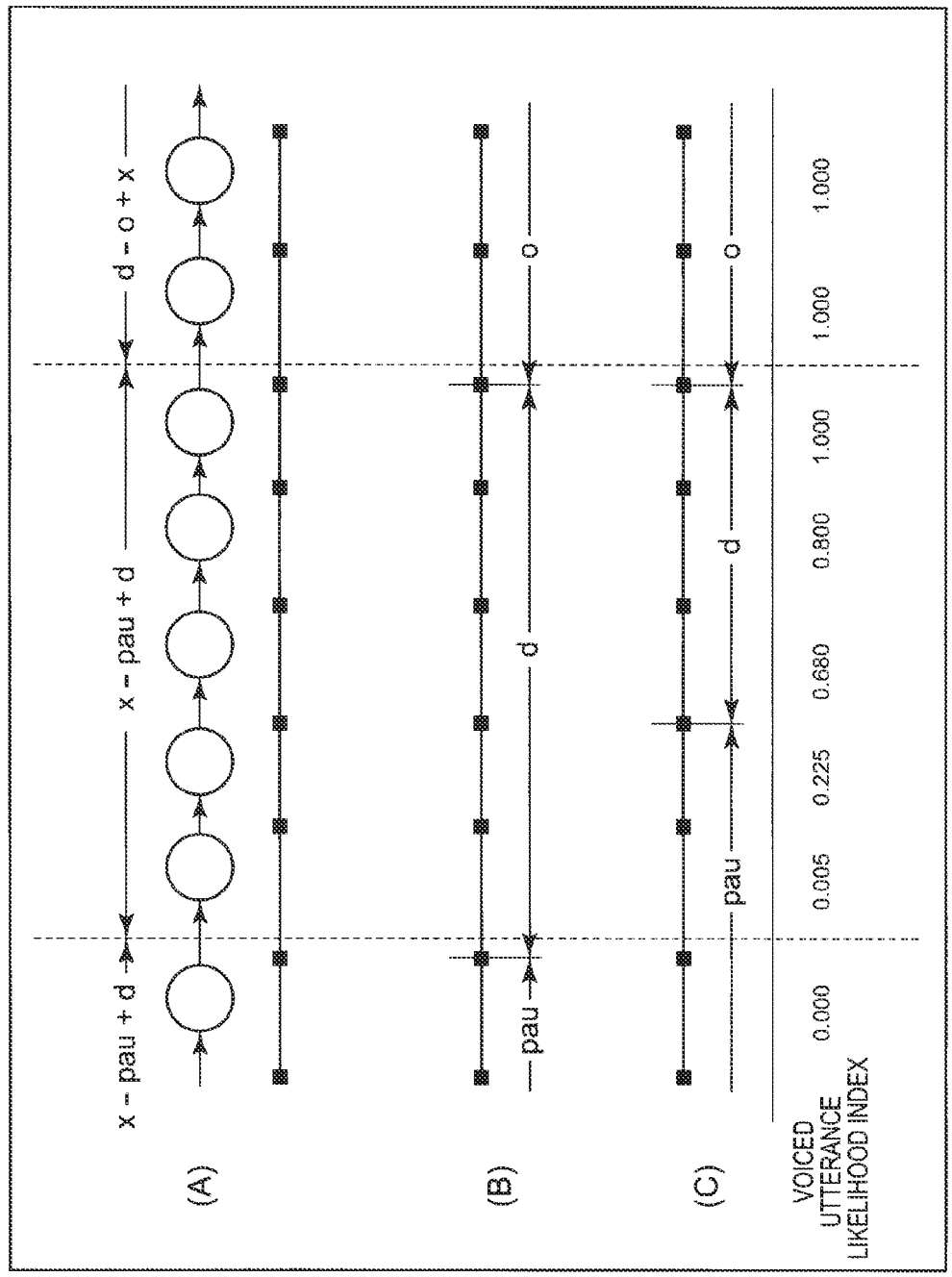
FIG. 7 It depicts an explanatory view illustrating an example of a result of changing a phoneme boundary position.

FIG. 7 depicts an explanatory view illustrating an example of a result of changing a phoneme boundary position. When, for example, one phoneme is represented by five states (see FIG. 7(A)), if a general method is used, a phoneme duration is the number of analytical frames and the number of states at minimum. Hence, as illustrated in FIG. 7(B), the phoneme duration of d immediately after a pause needs to be represented by the five states even though the phoneme duration goes below 25 msec. However, in the present exemplary embodiment, the phoneme boundary position is updated using a voiced utterance likelihood index. Hence, by providing three states of a state of d immediately after the pause, it is possible to represent a phoneme by a short duration (see FIG. 7(C)).

Second Exemplary Embodiment

Next, a second exemplary embodiment of the present invention will be described. The present exemplary embodiment assumes that an inadequate value is likely to be included in a voiced utterance likelihood index. That is, a voiced utterance likelihood index is a value derived by various types of calculation (a statistical method in the present exemplary embodiment). Hence, an adequate numerical value is not necessarily obtained. When the voiced utterance likelihood index is inadequate, it is difficult to adequately determine a boundary of voiced/unvoiced in the first exemplary embodiment.

There are roughly two cases where a voiced utterance likelihood index is inadequate. The first case is that voiced utterance likelihood determination information in each state in a target phoneme is switched two or more times. The second case is that all states (frames) indicate voiced states or unvoiced states contrary to phonetic piece phoneme information of the target phoneme.

Figure 8:
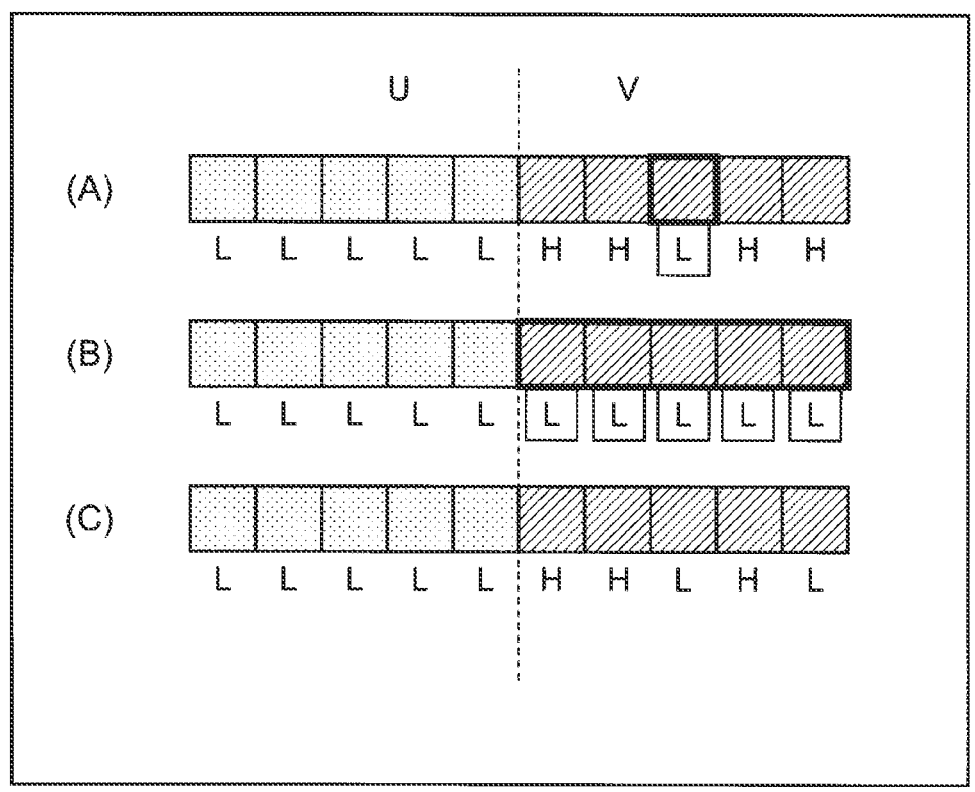
FIG. 8 It depicts an explanatory view illustrating an example of an inadequate voiced utterance likelihood index.

FIG. 8 depicts an explanatory view illustrating an example of an inadequate voiced utterance likelihood index. In the examples illustrated in FIG. 8, the cases illustrated in FIGS. 8(A) and (C) correspond to the above first case. For example, according to the example illustrated in FIG. 8(A), only a center state of a voiced phoneme is "L" as voiced utterance likelihood determination information. In this case, there is a plurality of portions which is a candidate of a phoneme boundary position and at which voiced utterance likelihood determination information switches between "H" and "L", and therefore it is difficult to determine a boundary. The example illustrated in FIG. 8(C) corresponds to the above second case. Also in this case, there is a plurality of candidates of a boundary, and therefore it is difficult to determine the boundary in the same way.

Further, the case illustrated in FIG. 8(B) corresponds to the second case. In the example illustrated in FIG. 8(B), all states (frames) of voiced phonemes indicate unvoiced states. In this case, there is no portion at which voiced utterance likelihood determination information switches between "H" and "L" and there is no candidate of a boundary, and therefore it is difficult to determine the boundary. In the present exemplary embodiment, a method of adequately determining a phoneme boundary position even when an inadequate value is included in a voiced utterance likelihood index will be described.

Figure 9:
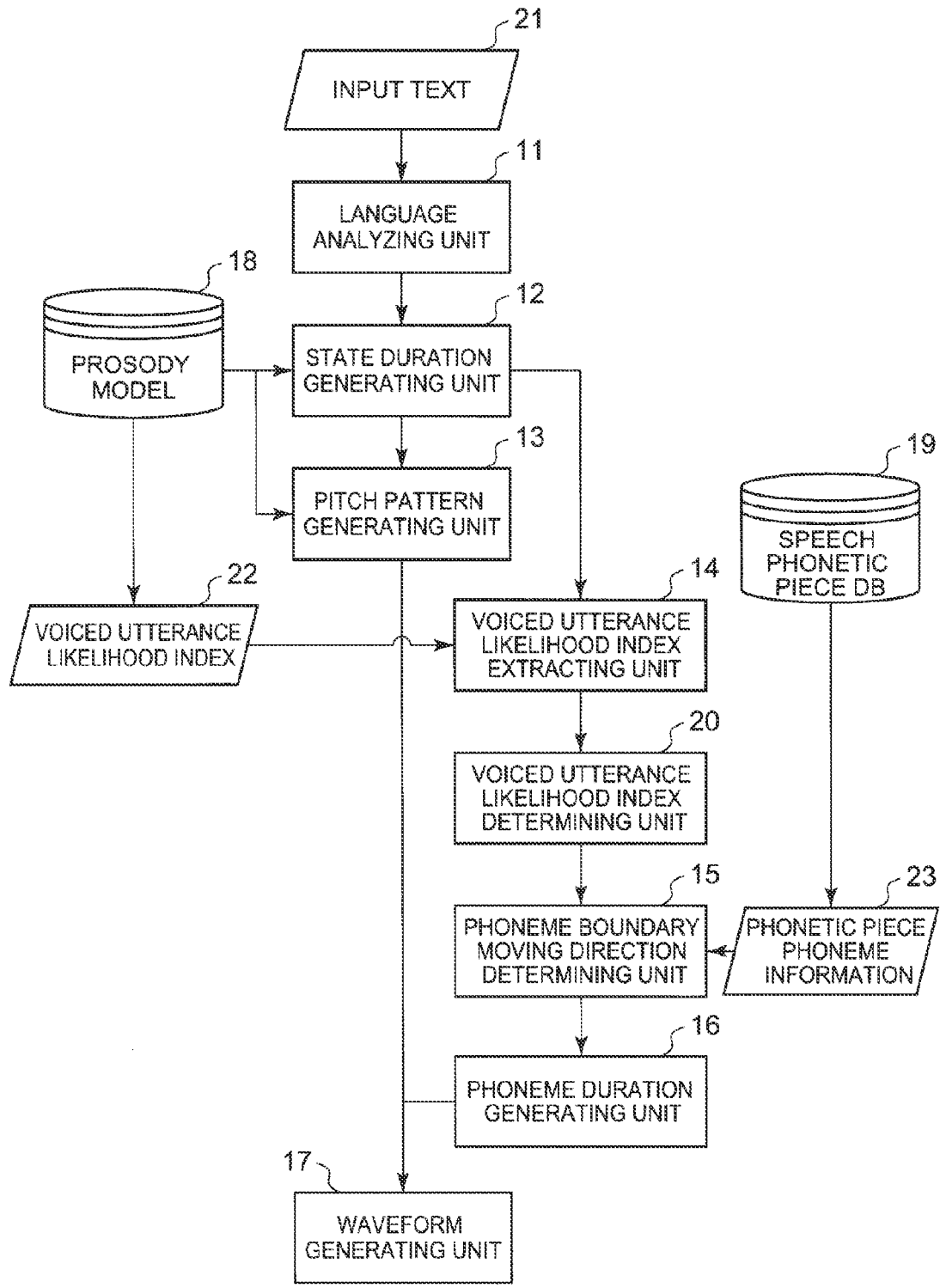
FIG. 9 It depicts a block diagram illustrating a configuration example of a speech synthesis device according to a second exemplary embodiment of the present invention.

FIG. 9 depicts a block diagram illustrating a configuration example of a speech synthesis device according to a second exemplary embodiment of the present invention. In addition, the same configuration as that in the first exemplary embodiment will be assigned the same reference numerals as those in FIG. 1, and will not be described. The speech synthesis device according to the present exemplary embodiment includes a language analyzing unit 11, a state duration generating unit 12, a pitch pattern generating unit 13, a voiced utterance likelihood index extracting unit 14, a phoneme boundary moving direction determining unit 15, a phoneme duration generating unit 16, a waveform generating unit 17, a prosody model memory unit 18, a speech phonetic piece DB memory unit 19 and a voiced utterance likelihood index determining unit 20. That is, the speech synthesis device according to the present exemplary embodiment differs from the speech synthesis device according to the first exemplary embodiment in further including the voiced utterance likelihood index determining unit 20.

The voiced utterance likelihood index determining unit 20 determines whether or not a voiced utterance likelihood index of each state is adequate, and changes an inadequate voiced utterance likelihood index to an adequate value. As described above, the voiced utterance likelihood index determining unit 20 may determine that the voiced utterance likelihood index is inadequate when voiced utterance likelihood determination information is switched two or more times in one phoneme. Further, the voiced utterance likelihood index determining unit 20 may determine that a voiced utterance likelihood index is inadequate when voiced utterance likelihood determination information (voiced state/unvoiced information) of a target phoneme is information different from phonetic piece information (for example, opposite information). Thus, the voiced utterance likelihood index determining unit 20 determines that the voiced utterance likelihood index is inadequate when "there is a plurality of candidates" or "when there is no candidate" of a phoneme boundary position.

Further, when determining that a voiced utterance likelihood index is inadequate, the voiced utterance likelihood index determining unit 20 changes an inadequate voiced utterance likelihood index to an adequate value. The voiced utterance likelihood index determining unit 20 may change voiced utterance likelihood determination information based on the phonetic piece phoneme information 23 of the phoneme stored in the speech phonetic piece DB memory unit 19.

More specifically, when phonetic piece phoneme information of the phoneme indicates a voiced sound, the voiced utterance likelihood index determining unit 20 determines that frames belonging to this phoneme are voiced sounds (that is, voiced utterance likelihood determination information is "H"). Meanwhile, when phonetic piece phoneme information of the phoneme indicates an unvoiced, the voiced utterance likelihood index determining unit 20 determines that frames belonging to this phoneme are unvoiced sounds (that is, voiced utterance likelihood determination information is "L"). Further, the voiced utterance likelihood index determining unit 20 changes voiced utterance likelihood determination information of an original phoneme based on the determined voiced utterance likelihood determination information.

Furthermore, when there is a plurality of positions at which a voiced sound and an unvoiced switch, the voiced utterance likelihood index determining unit 20 may determine one of switching positions as a phoneme boundary position without using a phonetic piece phoneme information of the phoneme stored in the speech phonetic piece DB memory unit 19. The voiced utterance likelihood index determining unit 20 may determine as a phoneme boundary position a switching portion closest to the original phoneme boundary position. Meanwhile, when a candidate of a switching portion matches the original boundary, the voiced utterance likelihood index determining unit 20 only needs to determine the original boundary as a boundary between a voiced sound and an unvoiced as is.

Figure 10:
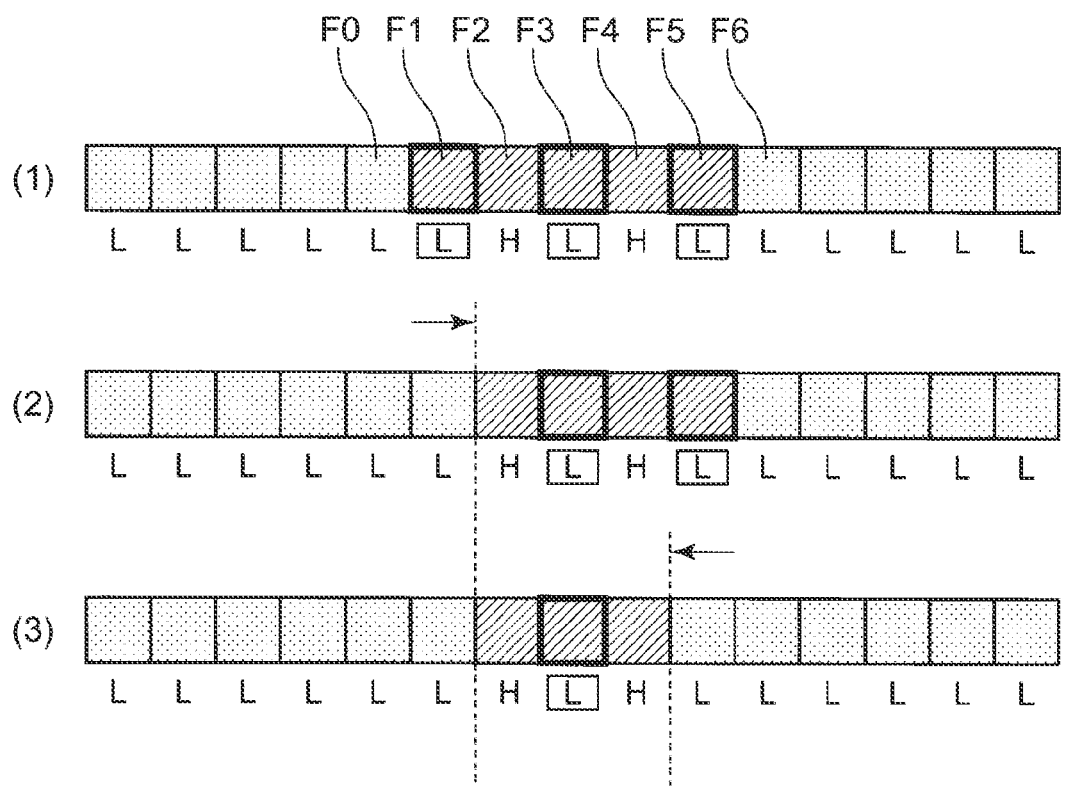
FIG. 10 It depicts an explanatory view illustrating an example of processing of determining a phoneme boundary position.

FIG. 10 depicts an explanatory view illustrating an example of processing of determining a phoneme boundary position. The example illustrated in FIG. 10(1) indicates a default state of voiced utterance likelihood determination information. Further, in this default state, voiced utterance likelihood determination information of a voiced phoneme (V) is arranged in order of "LHLHL". Further, each frame in the voiced phoneme (V) is indicated by F1 to F5. Furthermore, a last frame of an unvoiced phoneme ($U_1$) positioned before the voiced phoneme (V) is F0, and a first frame of an unvoiced phoneme ($U_2$) positioned after the voiced phoneme (V) is F6.

First, the voiced utterance likelihood index determining unit 20 focuses on a boundary between the unvoiced phoneme and the voiced phoneme (that is, the frame F0 and the frame F1). Both pieces of voiced utterance likelihood determination information of the frame F0 and F1 are "L". Then, the voiced utterance likelihood index determining unit 20 focuses upon voiced utterance likelihood determination information between frames nearby. Meanwhile, voiced utterance likelihood determination information of the frame F1 is "L", and voiced utterance likelihood determination information of the frame F2 is "H". Then, the voiced utterance likelihood index determining unit 20 determines the boundary between the frame F1 and the frame F2 as a switching portion closest to the original phoneme boundary position. Further, the voiced utterance likelihood index determining unit 20 moves the phoneme boundary position to this switching portion (see FIG. 10(2)).

Next, a frame near the boundary between a voiced phoneme and an unvoiced phoneme (that is, between the frame F5 and the frame F6) is focused upon. Meanwhile, voiced utterance likelihood determination information of the frame F4 is "L", and voiced utterance likelihood determination information of the frame F5 is "H". Then, the voiced utterance likelihood index determining unit 20 determines the boundary between the frame F4 and the frame F5 (that is, the boundary between the frame F5 and the frame F6) as a switching portion closest to the original phoneme boundary position. Further, the voiced utterance likelihood index determining unit 20 moves the phoneme boundary position to this switching portion (see FIG. 10(3)). In addition, in the example illustrated in FIG. 10, the frame F3 which has the center unvoiced state is ignored.

In addition, a case has been described above where a boundary between a voiced phoneme and an unvoiced phoneme is determined using voiced utterance likelihood determination information of each frame. Meanwhile, a voiced utterance likelihood index which is a continuous value may be directly used without using voiced utterance likelihood determination information which is a discrete value. In this case, the voiced utterance likelihood index determining unit 20 may determine as a phoneme boundary position a point which indicates a maximum difference among points which exceed a threshold set in advance. Further, when there is no switching point between voiced and unvoiced, there is no state which has a voiced utterance likelihood index which exceeds a threshold. In this case, the voiced utterance likelihood index determining unit 20 may determine as a phoneme boundary position a point which indicates a maximum difference. In this case, even when there is no state which has a voiced utterance likelihood index which exceeds a threshold, it is possible to determine a phoneme boundary position.

Figure 11:
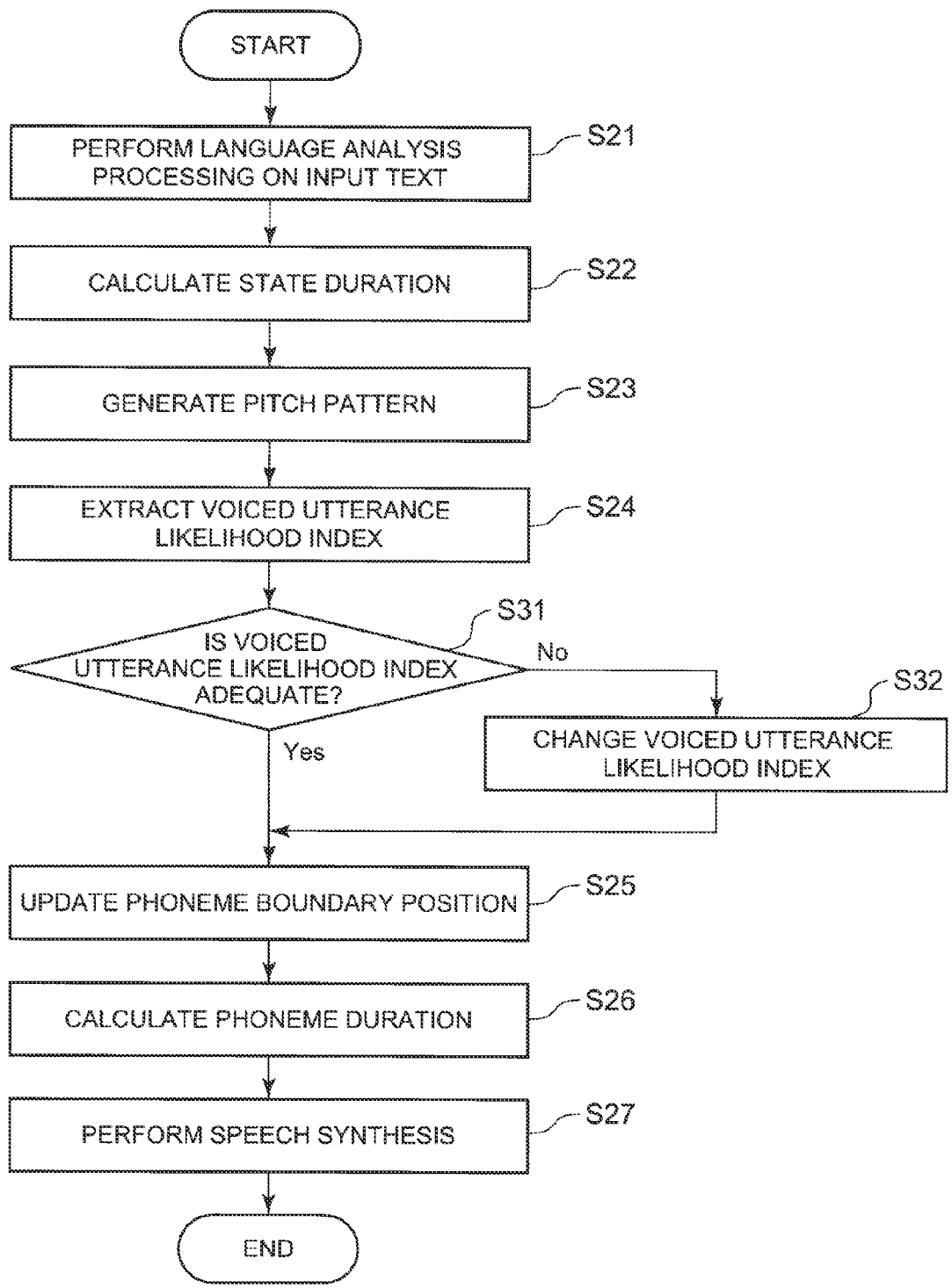
FIG. 11 It depicts a flowchart illustrating an example of an operation of the speech synthesis device according to the second exemplary embodiment.

Next, an operation of the speech synthesis device according to the present exemplary embodiment will be described. FIG. 11 depicts a flowchart illustrating an example of an operation of the speech synthesis device according to the present exemplary embodiment. In addition, processing of performing language analysis processing on the input text 21, generating a duration and a pitch pattern based on a prosody model and extracting the voiced utterance likelihood index 22 is the same as processing in step S21 to step S24 illustrated in FIG. 6.

Subsequently, the voiced utterance likelihood index determining unit 20 determines whether or not a voiced utterance likelihood index of each state is adequate (step S31). When the voiced utterance likelihood index is inadequate (No in step S31), the voiced utterance likelihood index determining unit 20 changes voiced utterance likelihood determination information of an original phoneme to an adequate voiced utterance likelihood index (step S32).

When the voiced utterance likelihood index is adequate (Yes in step S31) or after the voiced utterance likelihood index is changed, the phoneme boundary moving direction determining unit 15 updates a phoneme boundary position (step S25). Subsequently, processing where the phoneme duration generating unit 16 calculates a duration of each phoneme based on a phoneme boundary position and the waveform generating unit 17 generates a speech waveform based on the phoneme duration and the pitch pattern is the same as processing in step S26 and S27 illustrated in FIG. 6.

As described above, according to the present exemplary embodiment, the voiced utterance likelihood index determining unit 20 determines whether or not a voiced utterance likelihood index of each state is adequate, and changes a voiced utterance likelihood index which is determined to be inadequate to an adequate value.

Consequently, in addition to the effect of the first exemplary embodiment, a voiced utterance likelihood index of each state is corrected to an adequate value, so that it is possible to prevent an error of determination of a boundary from occurring.

Figure 12:
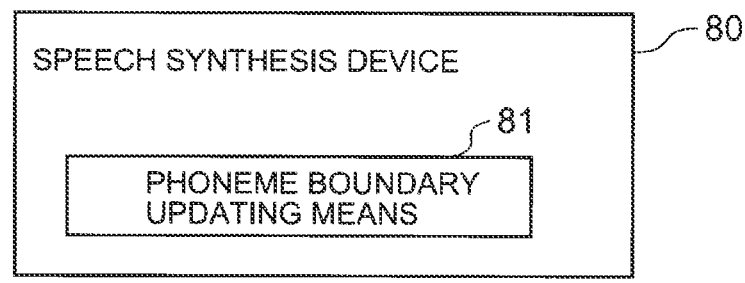
FIG. 12 It depicts a block diagram illustrating a minimum configuration example of a speech synthesis device according to the present invention.

Next, a minimum configuration of the present invention will be described. FIG. 12 depicts a block diagram illustrating a minimum configuration example of a speech synthesis device according to the present invention.

A speech synthesis device 80 according to the present invention includes a phoneme boundary updating means 81 (for example, the phoneme boundary moving direction determining unit 15) which, by using a voiced utterance likelihood index (for example, information derived from a prosody model per state) which is an index indicating a degree of voiced utterance likelihood of each state which represents a phoneme modeled by a statistical method (for example, MSD-HMM), updates a phoneme boundary position which is a boundary with other phonemes neighboring to the phoneme. Consequently, it is possible to represent a phoneme as a duration shorter than a duration upon modeling according to a statistical method.

The phoneme boundary updating means 81 may specify whether or not each state which represents the phoneme indicates a voiced state (for example, a state to which a flag "H" is set) or an unvoiced state (for example, a state to which a flag "L" is set) (for example, voiced utterance likelihood determination information), and, when one of the neighboring phonemes indicates the unvoiced sound (for example, "U" of UV types) and other one of the phonemes indicates a voiced sound (for example, "V" of the UV types), determine a moving direction of a phoneme boundary position according to a rule (for example, a correspondence relationship illustrated in FIG. 3) set in advance based on a relationship between the voiced state and the unvoiced state.

In this case, the phoneme boundary updating means 81 may specify as the voiced state a state which represents a phoneme when the voiced utterance likelihood index exceeds a threshold set in advance, and specify as the unvoiced state a state which represents a phoneme when the voiced utterance likelihood index is the threshold set in advance or less.

Further, the phoneme boundary updating means 81 may update the phoneme boundary position based on a difference (for example, $\Delta v_i$) between voiced utterance likelihood indices of neighboring states. More specifically, when the difference between the voiced utterance likelihood index of one of the neighboring states and the voiced utterance likelihood index of the other state exceeds the threshold set in advance, the phoneme boundary updating means 81 may determine as the phoneme boundary position a position between the one state and the other state.

Further, the speech synthesis device 80 may have a phoneme duration calculating means (for example, the phoneme duration generating unit 16) which calculates a duration of the phoneme based on the updated phoneme boundary position.

Furthermore, the phoneme boundary updating means 81 may update the phoneme boundary position in units of a length corresponding to a width of a state (for example, a frame length).

Still further, the speech synthesis device 80 may have a voiced utterance likelihood index determining means (for example, the voiced utterance likelihood index determining unit 20) which determines whether or not the voiced utterance likelihood index of each state is adequate and changes the voiced utterance likelihood index which is determined to be inadequate to an adequate value. According to this configuration, a voiced utterance likelihood index of each state is corrected to an adequate value, so that it is possible to prevent an error of determination of a boundary from occurring.

Further, when voiced utterance likelihood determination information which is a result of determining the voiced state or the unvoiced state based on the voiced utterance likelihood index is switched two or more times in one phoneme or when the voiced utterance likelihood determination information of a target phoneme indicates information different from phonetic piece information which is information set in advance as information indicating a property of the phoneme (when, for example, the voiced state or the unvoiced state contrary to the phonetic piece phoneme information is indicated), the voiced utterance likelihood index determining means may determine that the voiced utterance likelihood index is inadequate.

Although the present invention has been described above with reference to the exemplary embodiments and the examples, the present invention is by no means limited to the above exemplary embodiments and examples. Configurations and details of the present invention can be variously changed within a scope of the present invention one of ordinary skill in art can understand.

This application claims priority to Japanese Patent Application No. 2011-152849 filed on Jul. 11, 2011, the entire contents of which are incorporated by reference herein.

INDUSTRIAL APPLICABILITY

The present invention is suitably applied to a speech synthesis device which uses phoneme duration information generated by a statistical method.

REFERENCE SIGNS LIST

11: Language analyzing unit
12: State duration generating unit
13: Pitch pattern generating unit
14: Voiced utterance likelihood index extracting unit
15: Phoneme boundary moving direction determining unit
16: Phoneme duration generating unit
17: Waveform generating unit
18: Prosody model memory unit
19: Speech phonetic piece database memory unit
20: Voiced utterance likelihood index determining unit

The invention claimed is:

1. A speech synthesis device comprising:
hardware including a processor, wherein the processor is configured to:
by using a voiced utterance likelihood index which is an index indicating a degree of voiced utterance likelihood of each state which represents a phoneme modeled by a statistical method, update a phoneme boundary position which is a boundary with other phonemes neighboring to the phoneme; and
calculate a duration of each phoneme based on the updated phoneme boundary position, and generate synthesized speech based on the calculated duration of phoneme,
wherein, when a phoneme before and after a phoneme boundary is an unvoiced sound and a voiced sound, the processor is configured to determine whether a state before and after the phoneme boundary indicated a voiced state or an unvoiced state by using the voiced utterance likelihood index, and
wherein, when the state before and after the phoneme boundary are both determined as voiced state or an unvoiced state, the processor is configured to update the phoneme boundary position to move in a predetermined direction according to the state.

2. The speech synthesis device according to claim 1, wherein the processor is further configured to specify whether or not each state which represents the phoneme indicates a voiced state or an unvoiced state, and, when one of the neighboring phonemes indicates the unvoiced sound and other one of the phonemes indicates a voiced sound, determine a moving direction of a phoneme boundary position according to a rule set in advance based on a relationship between the voiced state and the unvoiced state.

3. The speech synthesis device according to claim 2, wherein the processor is further configured to specify as the voiced state a state which represents a phoneme when the voiced utterance likelihood index exceeds a threshold set in advance, and specify as the unvoiced state a state which represents a phoneme when the voiced utterance likelihood index is the threshold set in advance or less.

4. The speech synthesis device according to claim 1, wherein the processor is further configured to update the phoneme boundary position based on a difference between voiced utterance likelihood indices of neighboring states.

5. The speech synthesis device according to claim 4, wherein, when the difference between the voiced utterance likelihood index of one of the neighboring states and the voiced utterance likelihood index of the other state exceeds the threshold set in advance, the processor is further configured to determine as the phoneme boundary position a position between the one state and the other state.

6. The speech synthesis device according to claim 1, wherein the processor is further configured to calculate a duration of the phoneme based on the updated phoneme boundary position.

7. The speech synthesis device according to claim 1, wherein the processor is further configured to update the phoneme boundary position in units of a length corresponding to a width of a state.

8. The speech synthesis device according to claim 1, wherein the processor is further configured to determine whether or not the voiced utterance likelihood index of each state is adequate and change the voiced utterance likelihood index which is determined to be inadequate to an adequate value.

9. The speech synthesis device according to claim 8, wherein, when voiced utterance likelihood determination information which is a result of determining the voiced state or the unvoiced state based on the voiced utterance likelihood index is switched two or more times in one phoneme or when the voiced utterance likelihood determination information of a target phoneme indicates information different from phonetic piece information which is information set in advance as information indicating a property of the phoneme, the processor is further configured to determine that the voiced utterance likelihood index is inadequate.

10. A speech synthesis method comprising,
by using a voiced utterance likelihood index which is an index indicating a degree of voiced utterance likelihood of each state which represents a phoneme modeled by a statistical method, updating a phoneme boundary position which is a boundary with other phonemes neighboring to the phoneme; and
calculating a duration of each phoneme based on the updated phoneme boundary position, and generating synthesized speech based on the calculated duration of phoneme,
wherein, when a phoneme before and after a phoneme boundary is an unvoiced sound and a voiced sound, determining whether a state before and after the phoneme boundary indicates a voiced state or an unvoiced state by using the voiced utterance likelihood index, and
wherein, when the state before and after the phoneme boundary are both determined as voiced state or an unvoiced state, updating the phoneme boundary position to move in a predetermined direction according to the state.

11. The speech synthesis method according to claim 10, further comprising specifying whether or not each state which represents the phoneme indicates a voiced state or an unvoiced state, and, when one of the neighboring phonemes indicates the unvoiced sound and other one of the phonemes indicates a voiced sound, determining a moving direction of a phoneme boundary position according to a rule set in advance based on a relationship between the voiced state and the unvoiced state.

12. The speech synthesis method according to claim 10, further comprising updating the phoneme boundary position based on a difference between voiced utterance likelihood indices of neighboring states.

13. A non-transitory computer readable information recording medium storing a speech synthesis program that, when executed by a processor, performs a method for:
by using a voiced utterance likelihood index which is an index indicating a degree of voiced utterance likelihood of each state which represents a phoneme modeled by a statistical method, updating a phoneme boundary position which is a boundary with other phonemes neighboring to the phoneme; and
calculating a duration of each phoneme based on the updated phoneme boundary position, and generating synthesized speech based on the calculated duration of phoneme,
wherein, when a phoneme before and after a phoneme boundary is an unvoiced sound and a voiced sound, determining whether a state before and after the phoneme boundary indicates a voiced state or an unvoiced state by using the voiced utterance likelihood index, and
wherein, when the state before and after the phoneme boundary are both determined as voiced state or an unvoiced state, updating the phoneme boundary position to move in a predetermined direction according to the state.

14. The non-transitory computer readable information recording medium according to claim 13, specifying whether or not each state which represents the phoneme indicates a voiced state or an unvoiced state, and, when one of the neighboring phonemes indicates the unvoiced sound and other one of the phonemes indicates a voiced sound, determining a moving direction of a phoneme boundary position according to a rule set in advance based on a relationship between the voiced state and the unvoiced state.

15. The non-transitory computer readable information recording medium according to claim 13, further comprising updating the phoneme boundary position based on a difference between voiced utterance likelihood indices of neighboring states.

* * * * *